United States Patent [19]

Cusick, III

[11] Patent Number: 5,248,868
[45] Date of Patent: Sep. 28, 1993

[54] MELDING GUN

[76] Inventor: Joseph B. Cusick, III, Rte. 1, Peck, Kans. 67120

[21] Appl. No.: 886,931

[22] Filed: May 22, 1992

[51] Int. Cl.$^5$ ............................................. B23K 9/00
[52] U.S. Cl. ................................. 219/137.62; 219/136
[58] Field of Search ........................... 219/137.62, 136

[56] References Cited

U.S. PATENT DOCUMENTS

| | | | |
|---|---|---|---|
| 4,284,873 | 8/1981 | Schluter | 219/137.62 |
| 4,297,561 | 10/1981 | Townsend et al. | 219/137.62 |
| 4,864,099 | 9/1989 | Cusick, III et al. | 219/137.62 |

FOREIGN PATENT DOCUMENTS 1-197074  8/1989  Japan ............................. 219/137.62

*Primary Examiner*—Clifford C. Shaw
*Attorney, Agent, or Firm*—John Wade Carpenter

[57] ABSTRACT

An air cooled welding gun assembly adapted to be operatively connected to an electrical power, shielding gas, and weld wire feed mechanism through a cable assembly and a connector assembly. The welding gun assembly includes a front connector block having a plurality of open recesses or channels wherethrough pressurized air is conveyed, and the connector assembly includes a rear connector block. Power, gas and cooling air are contained within the cable assembly and intercommunicate the connector block of the welding gun assembly with the rear connector block of the connector assembly. The welding gun assembly also includes an air cooled nozzle assembly. In one embodiment of the air cooled welding gun assembly, a hand held air cooled welding gun assembly is provided. In another embodiment, a robotic air cooled welding gun assembly is provided. In both embodiments, pressurized and refrigerated air cools non-insulated conductor wires along with cooling a rear connector assembly, a cable assembly, a front connector assembly or handle assembly, a conductor tube assembly, and a nozzle assembly.

6 Claims, 9 Drawing Sheets

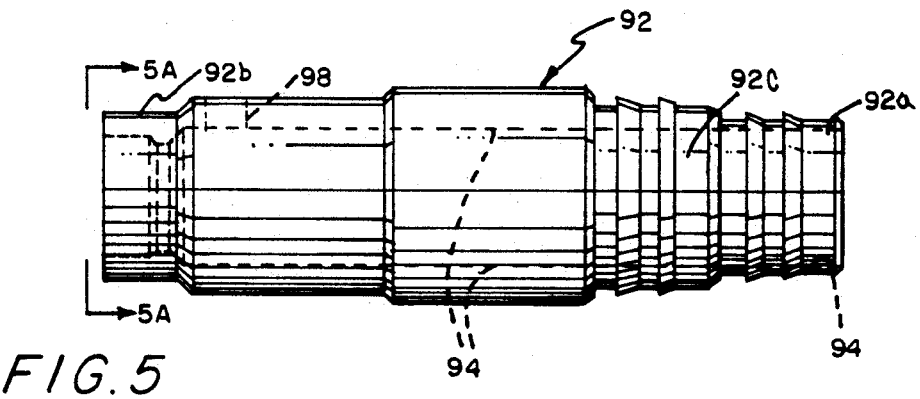
FIG. 5
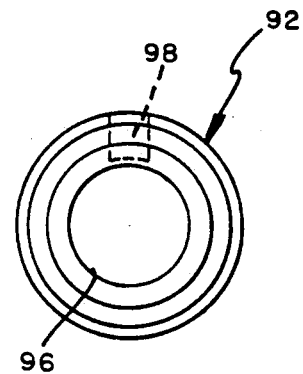
FIG. 5A
FIG. 6
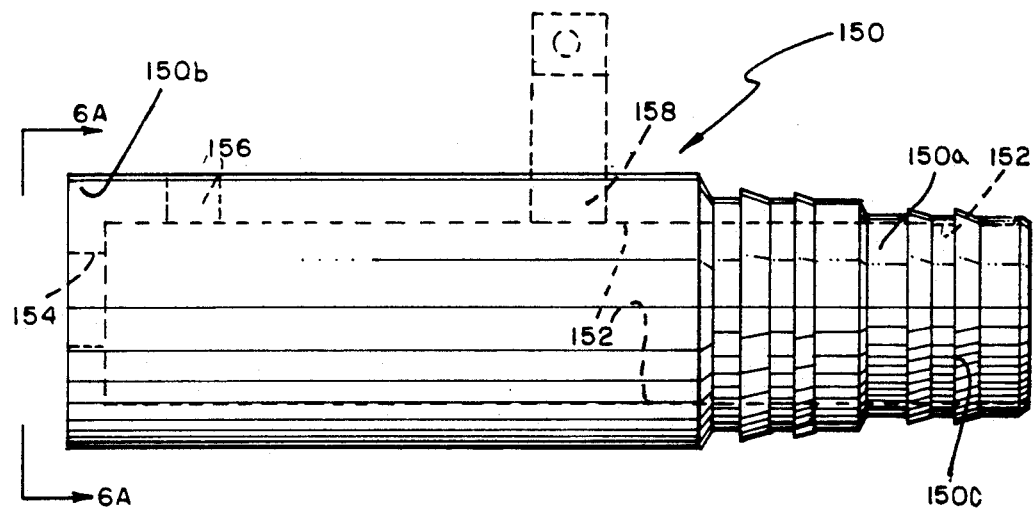
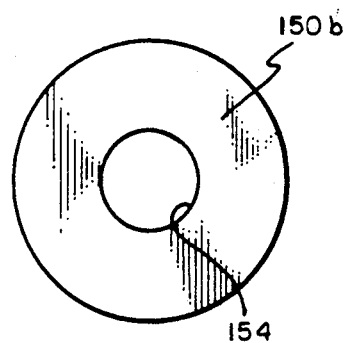
FIG. 6A

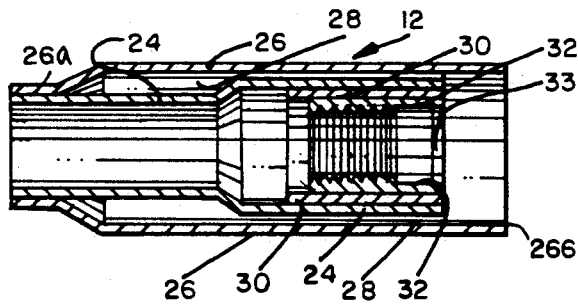
FIG. 15
FIG. 16
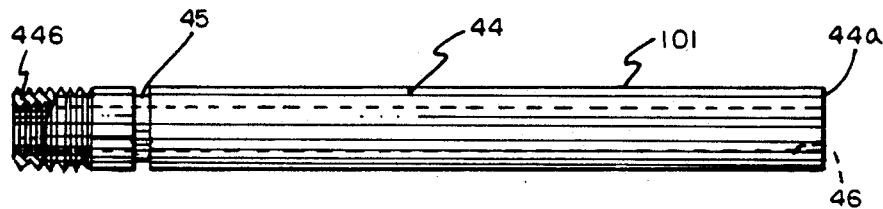
FIG. 17
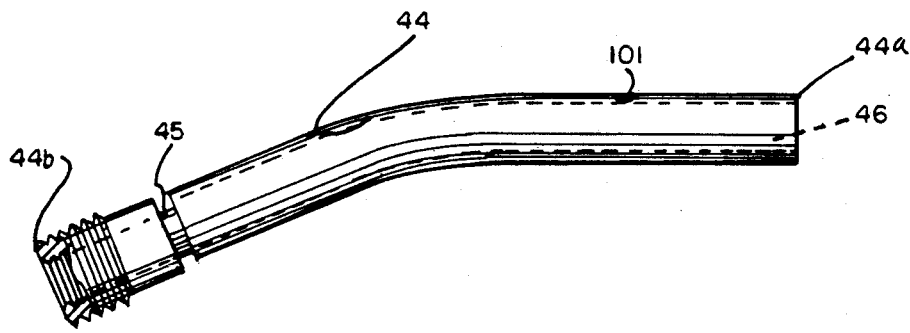
FIG. 18
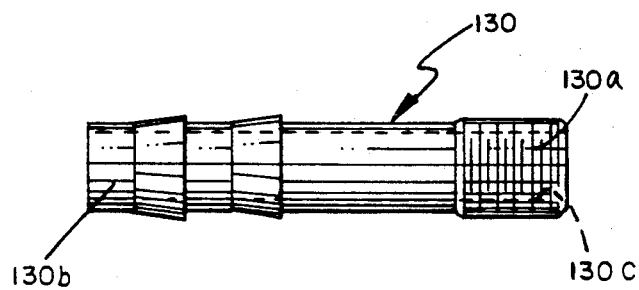

MELDING GUN

BACKGROUND OF THE INVENTION

1. Field of the Invention

This invention is related to a welding gun assembly. More particularly, this invention provides for a pressurized, air cooled welding gun assembly for controllably supplying weld wire, electrical power, and inert shielding gas to a working area.

2. Description of the Prior Art

This invention is an improvement on U.S. Pat. No. 4,297,561 entitled "Semi-Automatic Welding Gun", issued Oct. 27, 1981. U.S. Pat. No. 4,297,561 describes an air cooled semi-automatic welding gun assembly as contrasted with the air cooled semi-automatic welding gun assembly described and claimed herein. This invention is also an improvement on U.S. Pat. No. 4,864,099 entitled "Water Cooled Semi-Automatic Welding Gun", issued Sep. 5, 1989. U.S. Pat. No. 4,864,099 describes a water cooled welding gun assembly as further contrasted with the air cooled semi-automatic welding gun assembly described and claimed herein. Both U.S. Pat. Nos. 4,297,561 and 4,864,099 are fully incorporated herein as if repeated verbatim hereafter.

SUMMARY OF THE INVENTION

The present invention accomplishes its desired objects by broadly providing an air cooled welding gun apparatus for supplying welding wire, electrical power and shielding gas to a working area comprising:

(a) a rear connector assembly adapted to be connected to a welding wire feed mechanism, gas supply, air supply and a power and control circuit;

(b) a cable assembly connected to said connector assembly;

(c) a front connector assembly connected to said cable assembly, said front connector assembly including a front connector block means for removably attaching a gas and feed wire conduit and power and control conductors, said front connector block means comprising a structure defining a plurality of air channels wherethrough cooling air passes;

(d) a conductor tube assembly secured to the front connector assembly; and (e) a nozzle assembly secured to the conductor tube assembly, said nozzle assembly comprising a generally hollow inner nozzle housing and a generally hollow outer nozzle housing secured to the inner nozzle housing such that a substantial portion of the outer nozzle housing is coaxially spaced from the inner nozzle housing to define a nozzle annulus between the inner nozzle housing and the outer nozzle housing.

It is therefore an object of the present invention to provide an air cooled welding gun apparatus.

It is another object of the present invention to provide a hand held air cooled welding gun apparatus.

These, together with the various ancillary objects and features which will become apparent to those skilled in the art as the following description proceeds, are attained by this novel welding gun apparatus, a preferred embodiment being shown with reference to the accompanying drawings, by way of example only, wherein:

BRIEF DESCRIPTION OF THE DRAWINGS

FIG. 5 is a side elevational view of the front case;

FIG. 5A is an end elevational view taken in direction of the arrows and along the plane of line 5A—5A in FIG. 5;

FIG. 6 is a side elevational view of the rear case;

FIG. 6A is an end elevational view taken in direction of arrows and along the plane of line 6A—6A in FIG. 6;

FIG. 15 is a cross-sectional view of the generally hollow nozzle;

FIG. 16 is a side elevational view of a straight conductor tube;

FIG. 17 is a side elevational view of a curved conductor tube;

FIG. 18 is a side elevational view of a gas hose nipple;

DETAILED DESCRIPTION OF THE INVENTION

Figure 1:
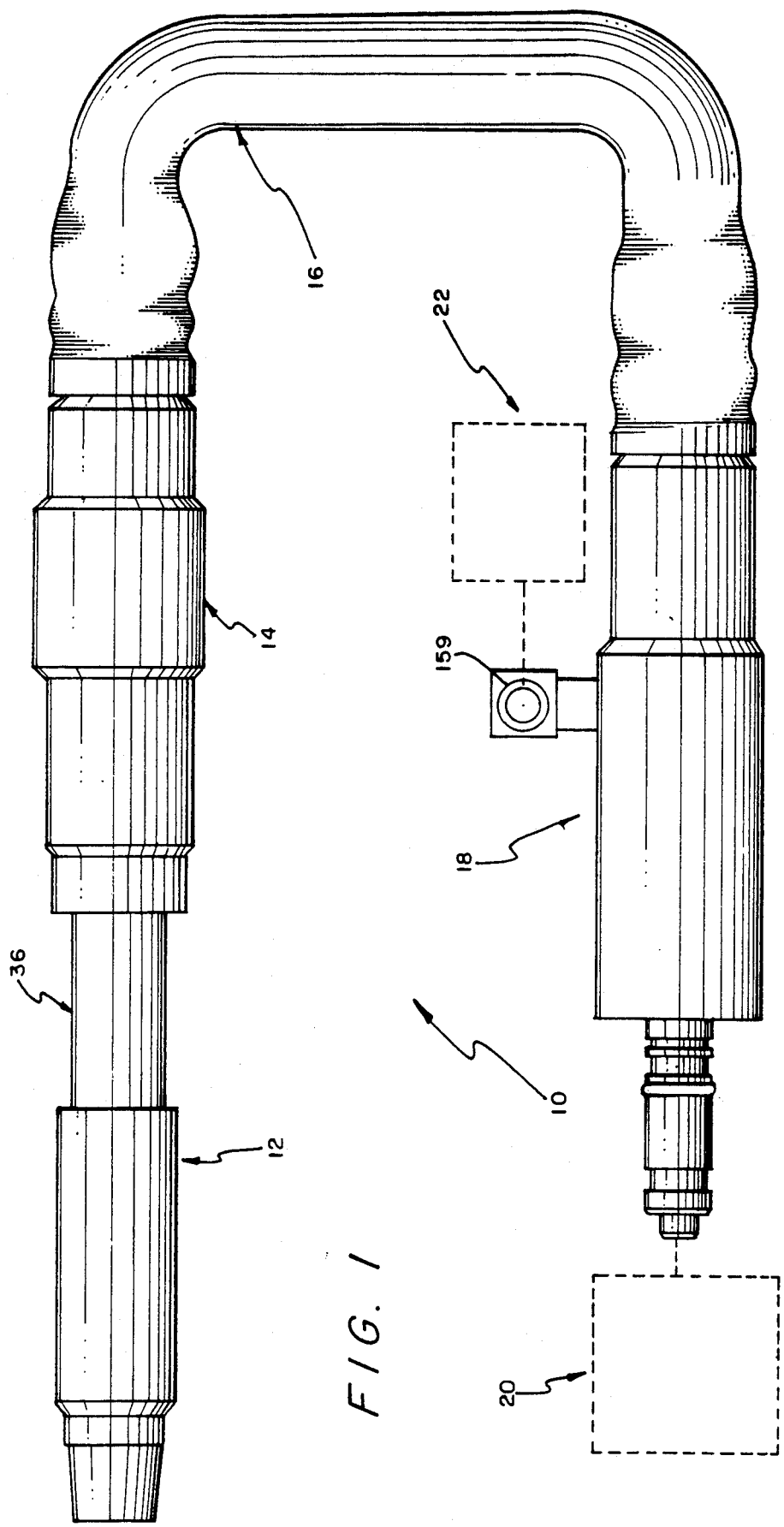
FIG. 1 is a side elevational view of one embodiment of the welding gun assembly, cable assembly, and connector assembly.

Referring in detail now to the drawings, wherein similar parts of the invention are identified by like reference numerals, there is seen a preferred embodiment of a welding gun assembly, generally illustrated as 10. There are two preferred embodiments of the invention; namely, a robotic welding gun embodiment and a hand held welding gun embodiment. The preferred embodiment of the invention depicted in FIGS. 1, 2, 5, 6, 9-16 and 18-19 is the robotic embodiment, whereas the preferred embodiment depicted in FIGS. 3, 4, 6-8, 9-15, and 17-20 is the hand held welding gun embodiment. The welding gun assembly 10 comprises a nozzle assembly 12 which is engaged to and/or coupled to a handle or connector assembly 14 through a conductor tube assembly, generally illustrated as 36. The handle or connector assembly 14 will hereinafter be referred to as the handle assembly 14. The handle assembly 14 is secured to one extreme end of a cable assembly 16. The other extreme end of the cable assembly 16 is secured to a connector assembly 18. The connector assembly 18 is adapted for removable connection with a source of power, inert shielding gas, and a welding wire feed mechanism (i.e. a welding machine), generally illustrated in dotted line block diagram form as 20. In addition, the connector assembly 18 is also in communication with an air source (e.g. a compressor; a refrigerated, compressed air supply; etc.), generally illustrated in dotted line block diagram form as 22. The air source 22 may be any suitable air source or supply, preferably one that is capable of supplying a forced and/or pressurized air (more preferably refrigerated and/or dehydrated air). Dry air at atmospheric sea level conditions typically comprises:

| Substance | % by Wt. | % by Vol. |
| --- | --- | --- |
| Nitrogen | 75.53 | 78.00 |
| Oxygen | 23.16 | 20.95 |
| Argon |  | 0.93 |
| Carbon Dioxide |  | 0.033 |
| Neon |  | 0.0018 |
| Helium |  | 0.0005 |
| Methane |  | 0.0002 |
| Krypton |  | 0.0001 |
| Nitrous oxide |  | 0.000,05 |
| Hydrogen |  | 0.000,05 |
| Xenon |  | 0.000,008 |
| Ozone |  | 0.000,001 |

Thus, a feature of the present invention is that a pressurized cooled source of air comprising a substantially amount of nitrogen and oxygen, preferably over about 90.0% by volume nitrogen and oxygen, is employed in the welding gun assembly 10 of this invention. Stated alternatively, a feature of the present invention is to cool in the welding gun assembly 10 with a mixture consisting essentially of a major proportion of nitrogen and a minor proportion of oxygen. Electric power, shielding gas, welding wire, and forced cooling air is conveyed to the nozzle assembly 12 through the connector assembly 18, through the cable assembly 16, through the handle assembly 14, and through the conductor tube assembly 36, all in a fashion or manner to be more fully described hereinafter.

Figure 2:
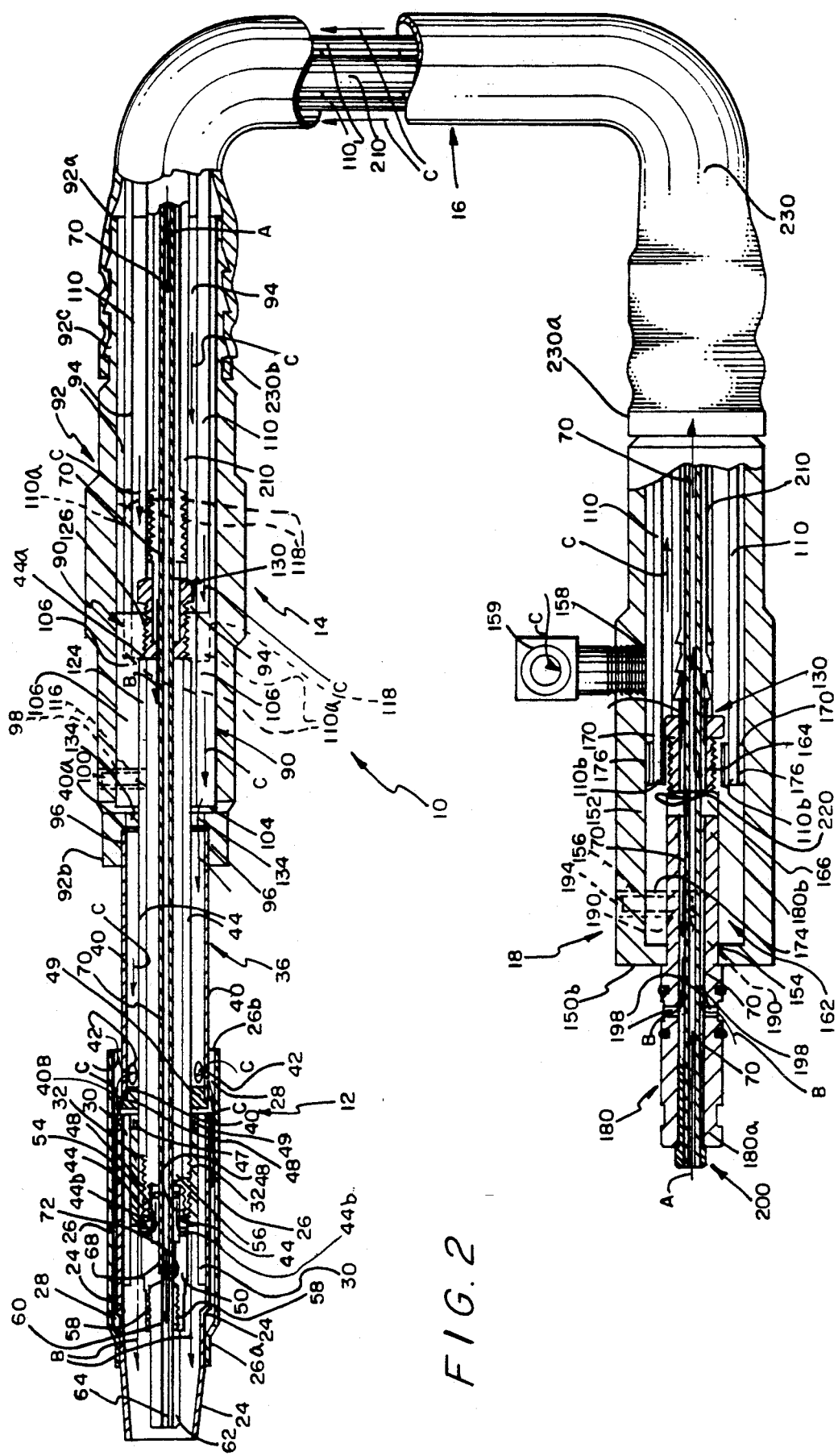
FIG. 2 is a cross-sectional view of a portion of the embodiment of the welding gun assembly, cable assembly, and connector assembly of FIG. 1.
Figure 3:
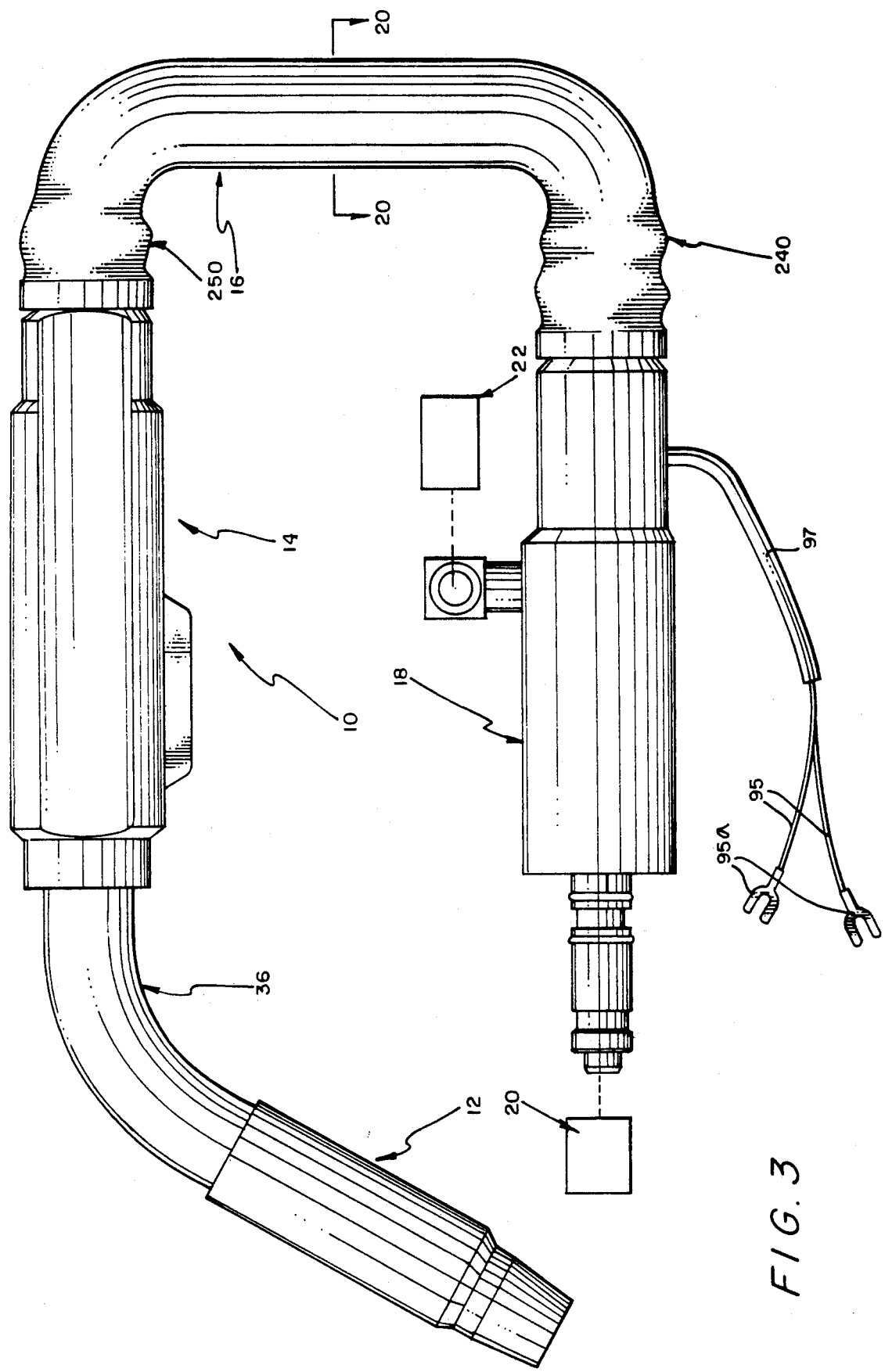
FIG. 3 is a side elevational view of another embodiment of the welding gun assembly, cable assembly, and connector assembly.
Figure 4:
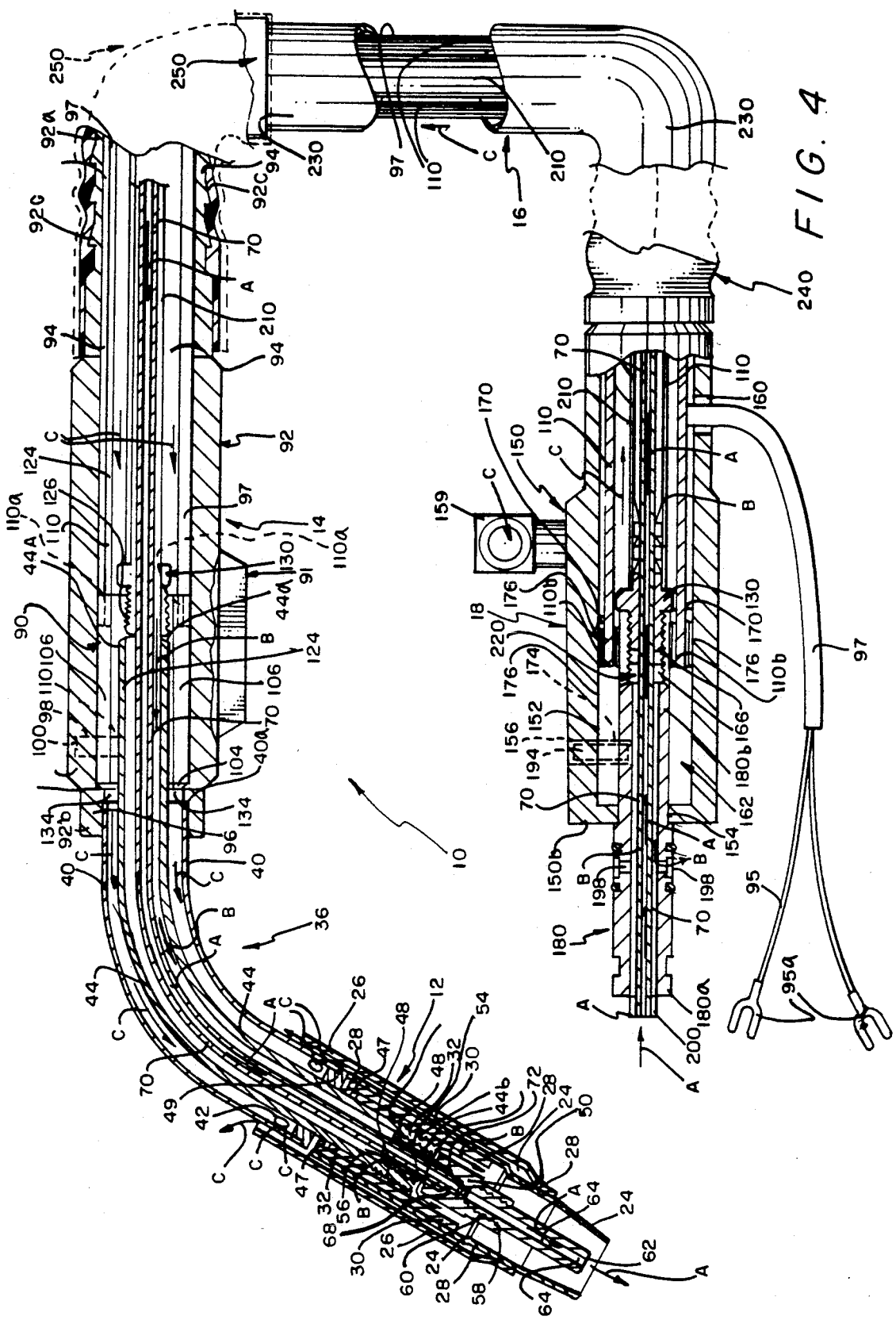
FIG. 4 is a cross-sectional view of a portion of the embodiment of the welding gun assembly, cable assembly, and connector assembly of FIG. 3.

The nozzle assembly 12, as best shown is FIGS. 2, 4 and 15, preferably comprises a generally hollow inner nozzle housing 24, preferably generally cylindrical in geometric shape; and a generally hollow outer nozzle housing 26, also preferably generally cylindrical in geometric shape, having an inward sloping end 26a secured to the inner nozzle housing 24 such that a substantial portion of the outer nozzle housing 26 is coaxially spaced from the inner nozzle housing 24 to define a space or nozzle annulus 28 between the inner nozzle housing 24 and the outer nozzle housing 26. The outer nozzle housing 26 has an open end 26b. One of the salient features of the present invention, is that forced or pressurized cooled air goes into, preferably entirely into, the annulus 28 for cooling the inner nozzle housing 24 which becomes hot from the welding process taking place internally therein. After cooling the inner nozzle housing 24 the forced cooling air exits through the open end 26b of the outer nozzle housing 26. An insulator member 30 is secured to and on the inside surface of the inner nozzle housing 24. A threaded inner insert member 32 is secured to the insulator member 30. The threaded inner insert member 32 has a recess 33 wherein an O-ring (identified as "47" below) lodges.

As previously mentioned, the nozzle assembly 12 is coupled to or engaged to the handle assembly 14 via the conductor tube assembly 36. The conductor tube assembly 36 connects to and extends into both the nozzle assembly 12 and the handle assembly 14. As best shown in FIGS. 2, 4 and 17, the conductor tube assembly 36 comprises an air shield housing 40, preferably cylindrical in geometric shape, having an end 40a that slidably passes into and engages the handle assembly 14. The air shield housing 40 also has an end 40b and a plurality of openings 42 wherethrough forced cooled air passes to enter the annulus 28 between the outer nozzle housing 26 and the inner nozzle housing 24. End 40b is supported by an air shield housing insulator 49. End 40a is open for receiving forced cool air therethrough. The conductor tube assembly 36 also comprises a generally hollow conductor tube 44 having ends 44a and 44b. As best shown in FIGS. 16 and 17, there are two embodiments for the conductor tube 44. More specifically, the conductor tube 44 may be straight (see FIGS. 2 and 16), or the conductor tube 44 may be curved (see FIGS. 4 and 17). Both embodiments of the conductor tube 44 include a recess 45 in the external surface thereof wherein an O-ring 47 lodges (see FIGS. 2 and 4). As previously indicated, the O-ring 47 also lodges in the recess 33 of the inner insert member 32. The conductor tube 44 is also formed with a recess opening 101 wherein an end of a screw (to be identified as "101" below) is to removably lodge. The conductor tube 44 has a bore 46 which is threaded internally at end 44b for threadably engaging and mating with a threaded external surface 48 of a generally hollow gas diffuser 50. The conductor tube 44 is also threaded externally at end 44b for threadably engaging and mating with the threaded insert member 32. A small external portion of the conductor tube 44 supports the air shield housing insulator 49.

The gas diffuser 50 is manufactured of thermally and electrically conductive material and the threaded external surface 48 threadably accommodates the internally threaded surface of the bore 46 at end 44b (as best shown in FIGS. 2 and 4). The gas diffuser 50 also has an enlarged bore 56 and a plurality of apertures 54 communicating with the enlarged bore 56. The gas diffuser 50 further has internal threads 58 which threadably accommodate coaxially an externally threaded end 60 of a hollow contact tip 62 of copper or other thermally and electrically conductive material. The gas diffuser 50 slidably engages and supports an end 68 of a liner 70. The hollow contact tip 62 has a bore 64 through which weld wire (not shown) is directed. A space 72 is provided or otherwise exist in the gas diffuser 50 between the end 68 of the hollow liner 70 and the contact tip 62. As will be further explained below, pressurized cooled air passes through and between the air shield housing 40 and the conductor tube 44, through the openings 42 of the air shield housing 40 and into the annulus 28. After passage into the annulus 28 to cool the inner nozzle housing 24, the pressurized or forced cooled air passes through the open end 26b of the outer nozzle housing and exits into the atmosphere. Shielding gas passes through and between the conductor tube 44 and the hollow liner 70, into the enlarged bore 56 and through the communicating apertures 54 and out into the spaces between the gas diffuser 50 and the insulator member 30 and inner nozzle housing 24, and into the space between the hollow contact tip 62 and the inner nozzle housing 24, all to assist in the welding process. The conductor tube 44 carries or conducts welding electricity or current from a front connector block (which is generally identified below as "90") of the handle assembly 14, to and through the gas diffuser 50 and into the contact tip 62 to make electrical contact with welding wire (not shown) passing through the liner 70, through the space 72, and through the bore 64 of the hollow contact tip 62.

The handle assembly 14 comprises a generally hollow front case, generally illustrated as 92 and having an end 92a and an end 92b. End 92a has an external structure defining a saw-tooth structure 92c. The generally hollow front case 92 additionally comprises a longitudinal bore 94 terminating in a bore 96 having a smaller diameter than the bore 94. Bore 96 slidably accommodates the end 40a of the air shield housing 40, as best shown in FIGS. 2 and 4. The generally hollow front case 92 additionally includes a case aperture 98 wherethrough a screw 100 passes for passing through a front connector block, identified as "90" below and into the recess opening 101 of the conductor tube 44. Such engagement of the screw 100 is to fixedly maintain the front connector block 90 and the conductor tube 44 in a stationary posture with respect to each other.

Figure 7:
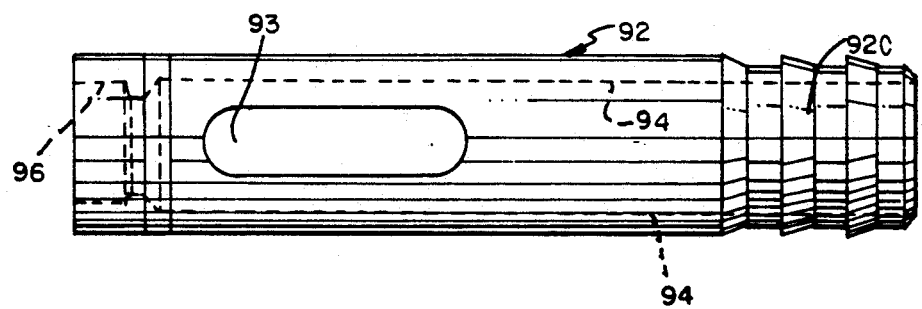
FIG. 7 is a side elevational view of the front case for the embodiment of the invention in FIGS. 3 and 4.
Figure 8:
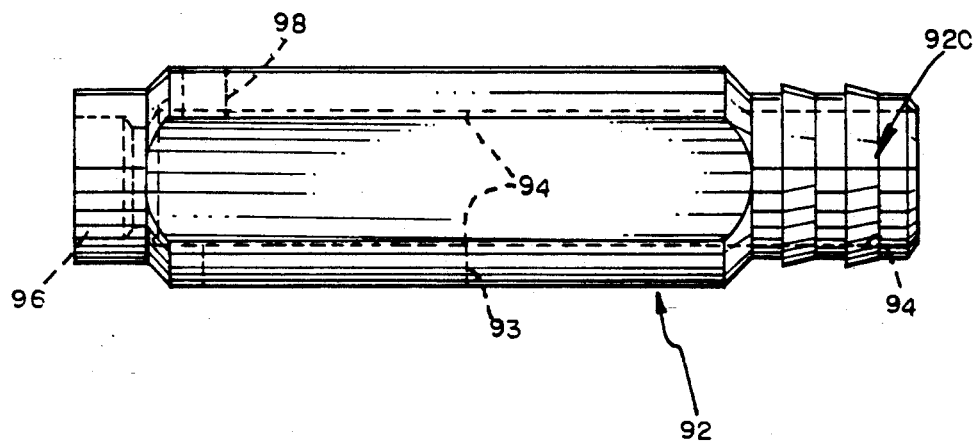
FIG. 8 is another side elevational view of the front case for the embodiment of the invention in FIGS. 3 and 4.

Referring now to FIGS. 7 and 8 for an embodiment of the generally hollow front case 92 employed in the embodiment of the invention depicted in FIG. 4, the handle assembly 14 comprises an actuator switch or trigger assembly 91 that slidably passes through a longitudinal opening 93 in the generally hollow front case 92. The actuator switch or trigger assembly 91 is engaged to a pair of conductors 95—95 that are housed in an insulated hose 97 and have ends 95a—95a that plug into the welding wire feed mechanism 20. The actuator switch or trigger assembly 91 is positioned to be grasped by the fingers of an operator when the hand grips the handle assembly 14, more specifically the hollow front case 92 of the handle assembly 14. Upon depression of the actuator switch or trigger assembly 91, the wire feed mechanism 20 commences the feeding of electrical power, shielding gas, and welding wire. The forming structure of both embodiments of the hollow front case 92 may consist of any suitable plastic material, such as Nylon, Lexan, or Acetal plastic material or Delvin.

Figure 9:
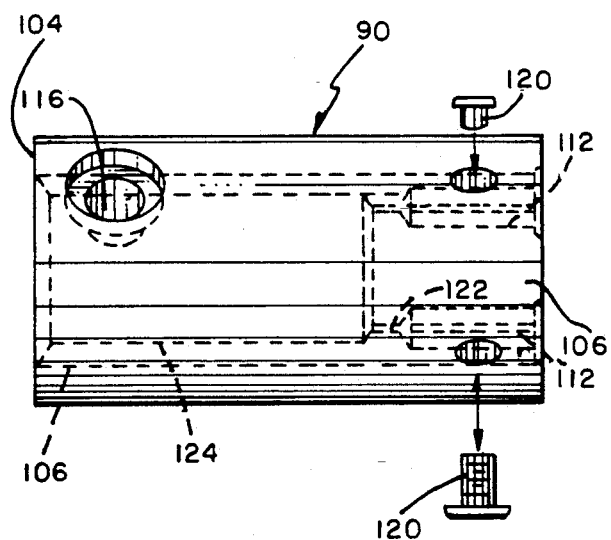
FIG. 9 is a side elevational view of the front connector.
Figure 10:
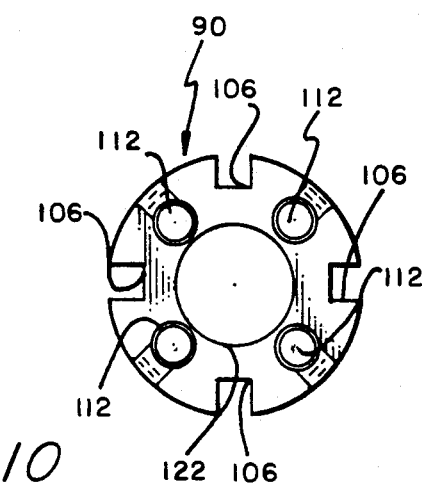
FIG. 10 is an end elevational view of the front connector in FIG. 9.
Figure 11:
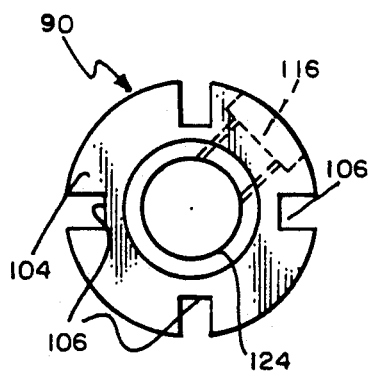
FIG. 11 is an end elevational view of the FIG. 9 front connector, opposed to the end depicted in FIG. 10.

A front connector block 90 slidably lodges in bore 94 of the front case 92, as shown in FIGS. 2 and 4. Referring now to FIGS. 9, 10 and 11, the front connector block 90 is formed of an electrically conductive material (e.g. copper) and is preferably cylindrical in shape with a structure defining a plurality of open longitudinally disposed recesses 106 which are preferably radially disposed equidistantly on and along the outside structure of the front connector block 90. As best shown in FIGS. 10 and 11, the recesses 106 are more preferably spaced circumferentially apart at a distance approximating a 90 degree arc. The recesses 106 are for conveying forced, pressurized cooled air into the annular space between the air shield housing 40 and the conductor tube 44, as will be further explained below. The forced cooled air cools the front connector block 90 after having initially cooled a plurality of exposed current conducting wires 110 (e.g. copper wires 110) having ends 110a and ends 110b. Ends 110a slidably pass into wire recesses 112 formed in the front connector block 90. Wire recesses 112 are of a desired dimension such that welding current passing through current conducting wires 110 is capable of continuing to flow through the front connector block 90 and into the conductor tube 44. As was previously mentioned, the conductor tube 44 is for conducting the welding current into and through the gas diffuser 50 and the hollow contact tip 62 to perform the welding process. Ends 110b slidably pass into similar wire recesses of a rear connector block (all to be identified below) of the connector assembly 18. The front connector block 90 additionally includes a structure defining an opening 116 passing radially therethrough and terminating in bore 124. Opening 116 receives the screw 100 after it passes through the case aperture 98. The front conductor block 90 also has a structure defining a plurality of set screw threaded apertures 118 which communicate with the wire recesses 112 to threadably receive set screws 120 which engage the ends 110a of the wires 110 to steadfastly hold the same within the wire recesses 112. The front connector block 90 further has an end 104 and a pair of longitudinal bores 122 and 124. Bore 124 terminates in bore 122 such that the two bores are capable of communicating with each other. As best shown in FIGS. 2 and 4, bore 124 slidably receives the conductor tube 44, more specifically the end 44a of the conductor tube 44. Bore 122 is a threaded bore for threadably receiving a generally hollow front gas nipple 130. The liner 70 passes through the hollow front gas nipple 130 and, as previously indicated, through the conductor tube 44. Shielding gas passes between the insides of the front gas nipple 130 and the outsides of the liner 70 and through the front gas nipple 130, and into and through the annular spaces between the liner 70 and the insides of the conductor tube 44. An open space 134 within the hollow front case 92 is provided between the end 104 of the front connector block 90 and the end 40a of the air shield housing 40 to provide a passageway for forced, compressed cooled air emanating from the plurality of open longitudinal recesses 106. After passing through the open space 134, the forced, compressed cooled air passes into the annular space between the insides of the air shield housing 40 and the outsides of the conductor tube 44.

Figure 12:
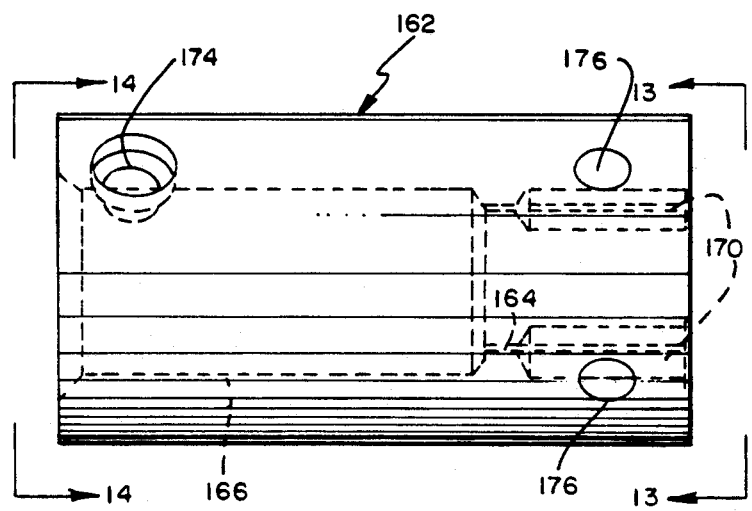
FIG. 12 is a side elevational view of the rear connector.
Figure 13:
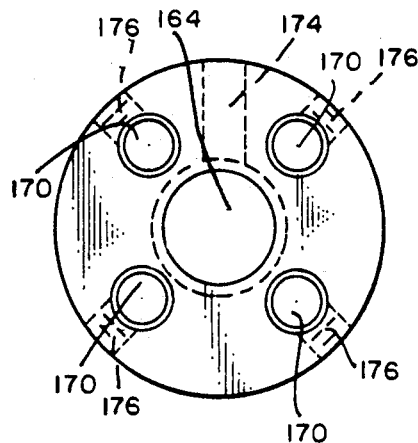
FIG. 13 is an end elevational view of the rear connector taken in direction of the arrows and along the plane of line 13—13 in FIG. 12.
Figure 14:
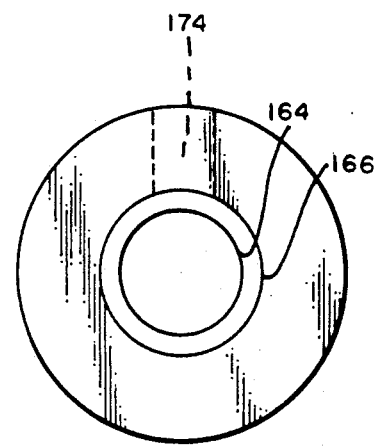
FIG. 14 is an end elevational view of the rear connector taken in direction of the arrows and along the plane of line 14—14 in FIG. 12.
Figure 19:
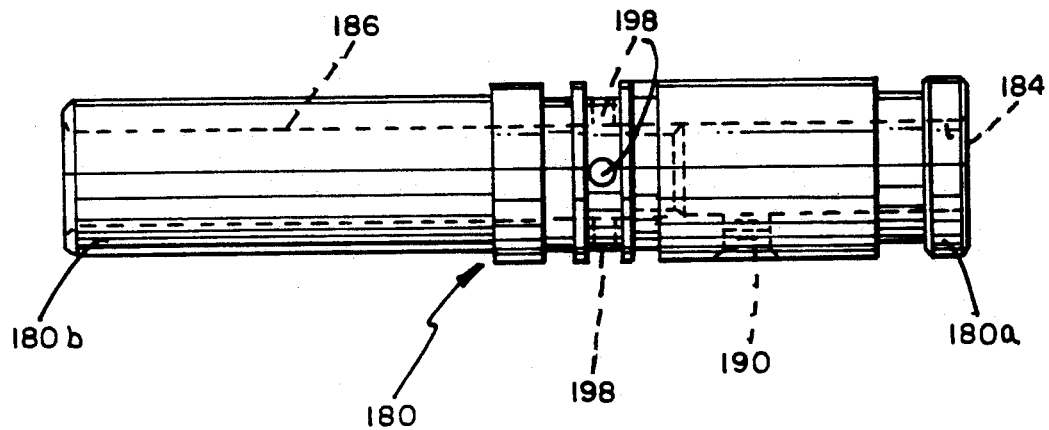
FIG. 19 is a side elevational view of a connector plug.
Figure 20:
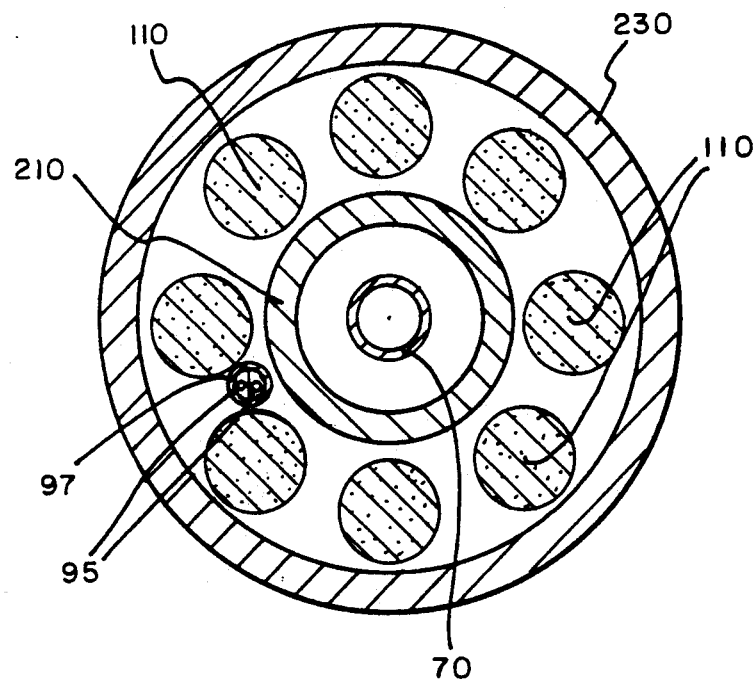
FIG. 20 is a vertical sectional view taken in direction of the arrows and along the plane of line 20—20 in FIG. 3.

The connector assembly 18 comprises a generally hollow rear case, generally illustrated as 150 and having an end 150a and an end 150b. The hollow rear case 150 is formed with a longitudinal bore 152. Bore 154 is formed in the end 150b such as to coaxially communicate with longitudinal bore 152. Bore 154 has a smaller diameter than the longitudinal bore 152. End 150a has an external structure defining a saw-tooth structure 150c. The generally hollow rear case 150 additionally includes a case aperture 156 and a case opening 158 for securely receiving a hollow right angle gas nipple 159. Gas nipple 159 is communicatively engaged to the air source 22 to provide an open structure for dispensing pressurized, cooled air onto the exposed wires 110 to cool the same. The hollow rear case 150 in the embodiment of the invention depicted in FIG. 4 additionally has an opening 160 wherethrough the insulated hose 97 and the associated conductors 95—95 pass. The connector assembly 18 additionally comprises a rear connector block 162 which slidably lodges in the bore 152 of the rear case 150. Referring now to FIGS. 12, 13, and 14, the rear connector block 162 is formed of an electrically conductive material (e.g. copper) and is preferably cylindrical in geometric shape. The rear connector block 162 is formed with a threaded longitudinal bore 164 and a generally smooth longitudinal bore 166 that coaxially communicates with the threaded longitudinal bore 164 and possesses a slightly larger diameter than the latter. Wire recesses 170 are formed in the rear connector block 162 for slidably receiving the ends 11b of the current conducting wires 110. Wire recesses 170 are of a desired dimension such that welding current passing through the rear connector block 162 is capable of continuing to flow into and through the current conducting wires 110. The rear connector block 162 additionally includes a structure defining an opening 174 passing radially therethrough and terminating in bore 166. The rear connector block 162 further has a structure possessing a plurality of set screw threaded apertures 176 which communicate with the wire recesses 170 to threadably receive set screws which engage the ends 110b of the wires to steadfastly hold the same within the wire recesses 170. A generally hollow connector plug, generally illustrated as 180 (see FIG. 19), slidably passes into and through bore 154 of the rear case 150, and into the generally smooth longitudinal bore 166 of the rear connector block 162, all as best shown in FIGS. 2 and 4. The connector plug 180 has a pair of opposed general ends 180a and 180b. General end 180b is the end of the connector plug 180 that slidably passes through bore 154 of the rear case 150 and into the bore 166 of the rear connector block 162 wherein it operationally lodges. End 180a of the connector plug 180 is the end of the connector plug 180 that slidably engages and mates with the source of power, inert shielding gas, and welding wire feed mechanism 20. The connector plug 180 is further formed with a pair of intercommunicating coaxial longitudinal bores 184 and 186. Opening 190 radially pierces the structure of the connector plug 180 and terminates in bore 184 to communicate therewith. Opening 190 (of the connector plug 180), opening 174 (of the rear connector block 162), and case aperture 156 (of the rear case 150) are all capable of being placed in registry with and among each other; and when collimation is achieved as best shown in FIGS. 2 and 4, screw 194 is securely received by openings 190 and 174 and case aperture 156 to fixedly maintain the rear connector block 162 and the connector plug 180 in a stationary posture with respect to each other within the rear case 150. The connector plug 180 additionally comprises a plurality of radially disposed apertures 198—198—198—198, all of which terminate in bore 186 such that the source of power, inert shielding gas, and welding wire feed mechanism 20 can introduce inert shielding gas through the apertures 198 and into the longitudinal bore 186 of the connector plug 180. Longitudinal bore 184 in the general end 180a of connector plug 180 receives a liner insert 200 secured to and around a distal end of the liner 70 which passes through the bores 184 and 186 of the connector plug. As previously indicated, welding wire (not shown) is fed into and entirely through the liner 70 by the source of power, inert shielding gas, and welding wire feed mechanism 20, all for performing the welding operation. Shielding gas passing through apertures 198 passes into the annular space between the inside surface of the longitudinal bore 186 of the connector plug 180 and the outside surface of the liner 70 to be conveyed towards the threaded longitudinal bore 164 of the rear connector block 162. Longitudinal bore 164 threadably receives and mates with a generally hollow rear gas nipple 130 (see FIG. 18). The front and rear gas nipples 130 are identical, each having a threaded end 130a, a saw toothed structure shaped end 130b, and a longitudinal bore 130c. Threaded ends 130a—130a respectively threadably engage and mate with threaded bores 122 and 164 of the front connector block 90 and the rear connector block 162 respectively. A gas hose 210, which is part of the cable assembly 16, circumferentially engages at its opposed distal ends the saw toothed structure shaped ends 130b—130b of the two front and rear gas nipples 130—130. When the general end 180b of the connector plug 180b is slidably lodges within the bore 166 of the rear connector block 162 as best shown in FIGS. 2 and 4, a space, generally illustrated as 220, is between the general end 180b and the longitudinal bore 164 of the rear connector block 162. Shielding gas passes from the annular space between the inside surface of the bore 186 of the connector plug 180 and the outside surface of the liner 70, through the space 220 and into the longitudinal bore 164 of the rear connector block 162, into and through the annular space between the inside surface of longitudinal bore 130c of the hollow rear gas nipple 130 and the outside surface of the liner 70, and into and through the annular space between the inside surface of the gas hose 210 and the outside surface of the liner 70. Forced cooled air enters through the right angle air nipple 159 and into the annular space between the inside surface of the bore 152 of the rear case 150 and the outside surface of the gas hose 210. The feed mechanism 20 sends welding current through the rear connector plug 180 and into the rear connector block 162 from where the welding current is conducted into and through the wires 110.

The cable assembly 16 comprises the aforementioned gas hose 210 and the portion of the associated liner 70 passing therethrough, and a hollow cover 230 wherethrough the exposed wires 110 pass along with the gas hose 210 having the portion of the associated liner 70 extending longitudinally therein. The hollow cover 230 has a pair of opposed distal ends 230a and 230b which respectively circumferentially surround and engage the saw tooth structures 150c and 92c of the rear case 150 and the front case 92, respectively. The distal ends 230a and 230b may be covered, shielded, or the like with a pair of heat shrinking sleeves 240 and 250, respectively (see FIG. 4). The hollow cover 230 may be manufactured from any suitable safe material, such as a flexible rubber material which will be easily expanded by the pressurized cooled air flowing therethrough and in the annular space between the inside surface of the hollow cover 230 and the outside surfaces of the gas hose 210 and the wires 110 (and the outside surface of the insulated hose 97 for the embodiment of the invention depicted in FIG. 4). Such pressurized cooled air cools the exposed current conducting wires 110. The heat shrinking sleeves 240 and 250 may be manufactured from any material that shrinks when heated. Typically, when the sleeves 240 and 250 are initially slipped over the distal ends 230a and 230b a loose and/or spaced fit is formed between the sleeves 240 and 250 of the distal ends 230a and 230b respectively, as represented by the dotted line representation of sleeve 250 in FIG. 4. Subsequently, heat is applied to the sleeves 240 and 250 causing both of the same to respectively shrink around the opposed distal ends 230a and 230b of the hollow cover 230, as represented by the solid line representations of sleeves 240 and 250 in FIG. 4.

Continuing to refer in detail now to the drawings for operation of the invention, the end 180a of the connector plug 180, which is part of the connector assembly 18, is inserted into a female recess (not shown) of the power, gas and welding wire feed mechanism 20. The right angle air nipple 159 is engaged to the air source 22 such as to be able to receive therethrough a refrigerated, compressed air supply, preferably having a temperature ranging from about 0° F. to about 60° F., more preferably from about 35° F. to about 50° F. For the hand held embodiment (e.g. see FIGS. 3 and 4) of the gun assembly 10, the ends 95a—95a of the conductors 95—95 are electrically engaged to the feed mechanism 20, and the welding process is commenced by the depression of the trigger 91 causing a circuit to close in the feed mechanism 20. For the robotic embodiment (e.g. see FIGS. 1 and 2) of the gun assembly 10, the welding process is commenced by the depression of a start switch (not shown) on the feed mechanism 20. When the welding process is commenced, the feed mechanism 20 feeds weld wire (not shown) through the hollow liner 70. The weld wire traverses a path within the liner 70 represented by the arrows A in FIGS. 2 and 4, and exits through the contact tip 62. Welding current is fed by the feed mechanism 20 through the following serially engaged elements or parts: connector plug 180, rear connector block 162, the plurality of wires 110, front connector block 90, conductor tube 44, diffuser 50, and contact tip 62. Inert shielding gas is fed by the feed mechanism 20 through the apertures 198 of the connector plug 180 and traverses a path towards and through the apertures 54 of the diffuser 54 represented by the arrows B in FIGS. 2 and 4. Refrigerated, compressed air is fed by the air source 22 through the right angle air nipple 159 and into and through the annular spaces contiguous to the outside of the gas hose 210, through the recesses 106 of the front connector block 90, through the annular space between the air shield 40 and the conductor tube 44, through the openings 42 and into the annular space between the outer nozzle housing 26 and the inner nozzle housing 24 and exits through open end 26b of the outer nozzle housing 26; and more particularly transverses a path represented by arrows C in FIGS. 2 and 4.

While the present invention has been described herein with reference to particular embodiments thereof, a latitude of modification, various changes and substitutions are intended in the foregoing disclosure, and it will be appreciated that in some instances some features of the invention will be employed without a corresponding use of other features without departing from the scope of the invention as set forth.

I claim:

1. An air cooled welding gun apparatus for supplying welding wire, electrical power and shielding gas to a working area comprising:
   (a) a rear connector assembly adapted to be connected to a welding wire feed mechanism, gas supply, cooling air supply and a power and control circuit; a gas and feed wire conduit and a pair of non-insulated power and control conductors, all connected to said rear connector assembly;
   (b) a generally hollow cable assembly connected to said connector assembly for receiving cooling air from said rear connector assembly and for conducting cooling air, said gas and feed wire conduit passing through said generally hollow cable assembly, and said pair of non-insulated power and control conductors passing through said generally hollow cable assembly and being in contact with said cooling air;
   (c) front connector assembly connected to said cable assembly, said front connector assembly including a front connector block means for removably attaching thereto said gas and feed wire conduit and said pair of non-insulated power and control conductors, said front connector block means comprising a structure defining a plurality of air channels wherethrough said cooling air passes after having cooled said pair of non-insulated power and control conductors;
   (d) a conductor tube assembly secured to the front connector assembly and comprising a generally hollow conductor tube wherethrough said gas and feed wire conduit passes, and an air shield housing coupled to and supported by said generally hollow conductor tube in a spaced relationship to form a conductor tube annulus wherethrough said cooling air passes, said air shield housing having a structure defining at least one opening wherethrough cooling air exits the conductor tube annulus; and
   (e) a nozzle assembly secured to the conductor tube assembly, said nozzle assembly comprising a generally hollow inner nozzle housing and a generally hollow outer nozzle housing having a first outer nozzle end and a second out nozzle end, said first outer nozzle end being secured to the inner nozzle housing such that a substantial portion of the outer nozzle housing is coaxially spaced from the inner nozzle housing to define a nozzle annulus between the inner nozzle housing and the outer nozzle housing wherein cooling air enters after exiting through said at least one opening and having said second outer nozzle end spaced away from said hollow inner nozzle housing and extending beyond said at least one opening such that at least part of the cooling air can be directed towards the first outer nozzle end to cool the generally hollow inner nozzle housing and the cooling air can exit said nozzle annulus.

2. The air cooled welding gun apparatus of claim 1 wherein said air channels are open longitudinally disposed recesses.

3. The air cooled welding gun apparatus of claim 2 additionally comprising at least one heat shrinkable sleeve member engaged to the cable assembly and to the front connector assembly.

4. An air cooled welding gun apparatus for supplying welding wire, electrical power and shielding gas to a working area comprising:
   (a) a rear connector assembly adapted to be connected to a welding wire feed mechanism, gas supply cooling air supply and a power and control circuit; a gas and feed wire conduit and a pair of power and control conductors, all connected to said rear connector assembly;
   (b) a generally hollow cable assembly connected to said connector assembly for receiving cooling air from said rear connector assembly and for conducting cooling air, said gas and feed wire conduit passing through said generally hollow cable assembly, and said pair of power and control conductors passing through said generally hollow cable assembly;
   (c) front connector assembly connected to said cable assembly, said front connector assembly including a front connector block means for removably attaching thereto said gas and feed wire conduit and said pair of power and control conductors, said front connector lock means comprising a structure defining a plurality of air channels wherethrough said cooling air passes;

(d) a conductor tube assembly secured to the front connector assembly and comprising a generally hollow conductor tube wherethrough said gas and feed wire conduit passes, and an air shield housing coupled to and supported by said generally hollow conductor tube in a spaced relationship to form a conductor tube annulus wherethrough said cooling air passes, said air shield housing having a structure defining at least one opening wherethrough cooling air exits the conductor tube annulus;

(e) a nozzle assembly secured to the conductor tube assembly, said nozzle assembly comprising a generally hollow inner nozzle housing and a generally hollow outer nozzle housing having a first outer nozzle end and a second out nozzle end, said first outer nozzle end being secured to the inner nozzle housing such that a substantial portion of the outer nozzle housing is coaxially spaced from the inner nozzle housing to define a nozzle annulus between the inner nozzle housing and the outer nozzle housing wherein cooling air enters after exiting through said at least one opening and having said second outer nozzle end spaced away from said hollow inner nozzle housing and extending beyond said at least one opening such that at least part of the cooling air can be directed towards the first outer nozzle end to cool the generally hollow inner nozzle housing and the cooling air can exit said nozzle annulus.

5. The air cooled welding gun apparatus of claim 4 wherein said air channels are open longitudinally disposed recesses.

6. The air cooled welding gun apparatus of claim 4 additionally comprising at least one heat shrinkable sleeve member engaged to the cable assembly and to the front connector assembly.

* * * * *

UNITED STATES PATENT AND TRADEMARK OFFICE
CERTIFICATE OF CORRECTION

PATENT NO.  : 5,248,868
DATED       : September 28, 1993
INVENTOR(S) : Joseph B. Cusick, III It is certified that error appears in the above-identified patent and that said Letters Patent is hereby corrected as shown below:

Title page, item [54], MELDING should read WELDING

Signed and Sealed this

Twenty-second Day of March, 1994

Attest:

BRUCE LEHMAN

Attesting Officer

Commissioner of Patents and Trademarks